United States Patent [19]

Hertel et al.

[11] Patent Number: 4,987,221

[45] Date of Patent: Jan. 22, 1991

[54] BISDIAZONIUM SALTS OF 4,4'-DIAMINO-3,3'-DIALKOXYBIPHENYLS AND A PROCESS FOR THEIR PREPARATION

[75] Inventors: Hasso Hertel, Mühlheim am Main; Klaus Hunger, Kelkheim; Heinrich Frölich, Niedernhausen/Taunus, all of Fed. Rep. of Germany

[73] Assignee: Hoechst Aktiengesellschaft, Frankfurt am Main, Fed. Rep. of Germany

[21] Appl. No.: 844,858

[22] Filed: Mar. 27, 1986

[30] Foreign Application Priority Data

Mar. 29, 1985 [DE] Fed. Rep. of Germany ....... 3511547

[51] Int. Cl.$^5$ .................. C07c 245/20; D06P 3/68
[52] U.S. Cl. .................. 534/561; 534/558; 534/562; 534/565
[58] Field of Search ............. 534/556, 557, 565, 561, 534/562

[56] References Cited

U.S. PATENT DOCUMENTS

| | | | |
|---|---|---|---|
| 1,760,780 | 5/1930 | Schmidt et al. | 534/562 X |
| 1,962,111 | 6/1934 | Bamberger | 534/562 X |
| 2,707,181 | 4/1955 | Stanley et al. | 534/562 |
| 2,710,859 | 6/1955 | Kehrer et al. | 534/663 X |

FOREIGN PATENT DOCUMENTS

| | | | |
|---|---|---|---|
| 80652 | 3/1894 | Fed. Rep. of Germany | 534/557 |
| 11575 | of 1896 | United Kingdom | 534/557 |

OTHER PUBLICATIONS

Venkataraman, *The Chemistry of Synthetic Dyes,* vol. I, Academic Press, N.Y., 1952, pp. 668–672.

Kirk-Othmer, *Encyclopedia of Chemical Technology,* 2nd Ed., vol. 17, 1968, pp. 358–364.

*Primary Examiner*—Floyd D. Higel

[57] ABSTRACT

Bisdiazonium salts of the formula (1)

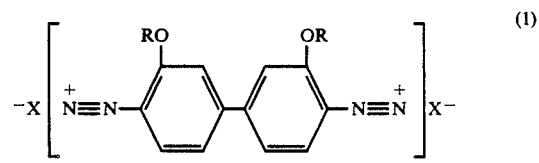

in which R denotes a linear or branched alkyl or alkoxyalkyl radical having 3–5 carbon atoms and X$^-$ represents the radical of a strong acid or of a zinc chloride double salt, and a process for their preparation by diazotizing a 4,4'-diamino-3,3'-dialkoxybiphenyl of the formula (2)

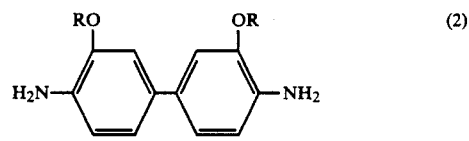

in which R has the meaning mentioned, in an aqueous, strong, non-oxidizing inorganic or organic acid at temperatures from about −10° C. to about +40° C. by means of an alkali metal nitrite, and precipitating the resulting bisdiazonium salts by adding an alkali metal chloride, bisulfate, monosulfonate of 1,5-naphthalenedisulfonic acid or tetrafluoroborate or zinc chloride.

These salts are useful in dyeing and printing textile fiber materials by the methods of the ice color technique, using suitable coupling components; they are also useful for preparing photographic tracings by the methods of reprography.

5 Claims, No Drawings

BISDIAZONIUM SALTS OF 4,4'-DIAMINO-3,3'-DIALKOXYBIPHENYLS AND A PROCESS FOR THEIR PREPARATION

The present invention relates to new bisdiazonium salts of 4,4'-diamino-3,3'-dialkoxybiphenyls, a process for their preparation and their use for dyeing and printing textile fiber materials by the methods of the ice color technique, i.e. for the production of water-insoluble azo dyestuffs, in particular on the fiber, using suitable coupling components, and also for the preparation of photographic tracings by the methods of reprography. New bisdiazonium salts of the general formula (1)

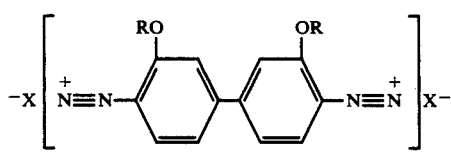

in which R denotes a linear or branched alkyl or alkoxyalkyl radical having a total of three to five carbon atoms, and X- represents the radical of a strong acid or of a zinc chloride double salt, have been found, and also a process for their preparation in which a 4,4'-diamino-3,3'-dialkoxybiphenyl of the formula (2)

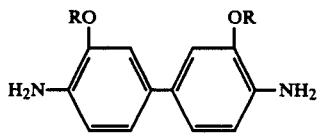

in which R has the meanings mentioned above is bisdiazotized in an aqueous, strong, non-oxidizing inorganic or organic acid, such as aqueous sulfuric acid, phosphoric acid, chloroacetic acid or, preferably, hydrochloric acid, by means of an alkali metal nitrite, preferably sodium nitrite, at temperatures from about −10° C. to about 40° C., preferably 0 to 30° C., and the bisdiazonium salts formed are precipitated by adding an alkali metal chloride, bisulfate, monosulfonate of 1,5-naphthalenedisulfonic acid or tetrafluoborate, for example the potassium salts or, preferably, the sodium salts, or zinc chloride.

Accordingly, the anion radical X- in the general formula (1) denotes Cl⁻, HSO₃-,

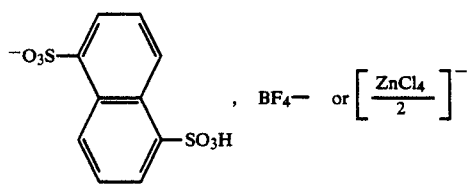

The precipitation of the bisdiazonium salt can be completed by salting out with alkali metal chlorides, such as sodium chloride or potassium chloride, or by concentrating the solutions or suspensions obtained.

The aqueous strong acid in which the bisdiazotization is carried out preferably has a concentration of about 3% to about 18%. The optimal concentration to be used in an individual case depends on the acids employed.

It is preferable to use 4.4 to 10 equivalents, preferably 5 to 6 equivalents, of acid per mol of diamine.

Suitable diamines of the formula (2) mentioned are 4,4'-diamino-3,3'-dipropoxybiphenyl, 4,4'-diamino-3,3'-bis-(1-methylethoxy)-biphenyl, 4,4'-diamino-3,3'-dibutoxybiphenyl, 4,4'-diamino-3,3'-bis-(1-methylpropoxy)-biphenyl, 4,4'-diamino-3,3'-bis-(2-methylpropoxy)-biphenyl, 4,4'-diamino-3,3'-bis-(1,1-dimethylethoxy)-biphenyl, 4,4'-diamino-3,3'-dipentoxybiphenyl, 4,4'-diamino-3,3'-bis-(3-methylbutoxy)-biphenyl, 4,4'-diamino-3,3'-bis-(2-methoxy-ethoxy)-biphenyl and 4,4'-diamino-3,3'-bis-(2-ethoxyethoxy)-biphenyl.

The preparation of the diamines mentioned can be effected, for example, by reducing o-nitroalkoxybenzenes in an alkaline medium to give diarylhydrazines, which are rearranged in a strongly acid medium to give the 4,4'-diamino-3,3'-dialkoxybiphenyls.

In order that the new bisdiazonium salts of the general formula (1) mentioned can be employed advantageously together with suitable coupling components for the preparation of water-insoluble azo dyestuffs on textile fibers, preferably textile fibers composed of natural or regenerated cellulose, it is advisable to convert the diazonium salts into preparations suitable for this purpose. This can be effected, for example, by mixing the diazonium salt, such as, for example, the tetrachlorozincate, while still moist from its preparation, with an approximately equal weight of sodium sulfate and then drying the mixture in a stream of air at 40° C., or by mixing the diazonium salt, while still moist from its preparation, with aluminum sulfate hexahydrate, magnesium sulfate monohydrate and sodium sulfate, removing, by external cooling, any heat of hydration which may be liberated. The mixtures thus prepared are finally preferably standardized to a specific percentage content, for example a content of about 20%, of diazonium salt by adding further sodium sulfate.

The application of the bisdiazonium salt in question in the form of the preparations mentioned together with suitable coupling components (the ice color technique) is known in principle and is described, for example, in K. Venkataraman, The Chemistry of Synthetic Dyes, Volume I, pages 650–740, in particular pages 668–672, Academic Press, New York, 1952. The use of the bisdiazonium salts for the preparation of photographic tracings by the methods of reprography is described in principle, for example, in Kirk-Othmer, Encyclopedia of Chemical Technology, Second Edition, Volume 17, pages 358–364, Interscience Publishers, New York, 1968.

EXAMPLE 1

328 parts of 4,4'-diamino-3,3'-dibutoxybiphenyl are introduced into 600 parts of water and are stirred thoroughly therein. 260 parts of 32% strength hydrochloric acid are then added dropwise, a mash of the hydrochloride being formed. After the mixture has been stirred for a further hour in order to complete the formation of the hydrochloride, a further 320 parts of 32% strength hydrochloric acid are added. The mixture is cooled to approx. 20° C. by external cooling. 370 parts of a 40% strength aqueous solution of sodium nitrite are then added dropwise at such a rate that nitrite is at first only slightly in excess, or not at all. In the course of this, the temperature rises to 30°–35° C. and it is kept at this level until the diazotization is complete. When the diazotization is complete, a distinct excess of nitrite should be present.

10 parts of clarifying charcoal are then added. The outflow is tested by spotting after about five minutes. If it is pure yellow, the mixture is filtered with suction after 10 parts of kieselguhr have been added; if it is still brown, further charcoal must be added. The residue is washed with a little water.

The temperature of the mixture is lowered during the clarification, and, if necessary, this lowering is continued during the precipitation which now follows, until a temperature of approx. 15° C. has been reached.

The bisdiazonium salt is precipitated by adding dropwise 450 parts of 33% strength aqueous zinc chloride solution to the slightly brownish solution of diazonium salt. In the course of this 3,3'-dibutoxybiphenyl-4,4'-bisdiazonium tetrachlorozincate is precipitated in beautiful yellow crystals. The precipitation is completed by adding 250 parts of sodium chloride. The bisdiazonium salt is then filtered off with suction and freed from the bulk of the adhering mother liquor by centrifugation. The residual moisture content is still approx. 8%.

EXAMPLE 2

(a) A preparation for the production of water-insoluble azo dyestuffs on the fiber is prepared by mixing the moist bisdiazonium salt (tetrachlorozincate) obtained in accordance with Example 1 with 50 parts of aluminum sulfate hexahydrate, 130 parts of magnesium sulfate monohydrate and 380 parts of sodium sulfate in a mixer which has an acid-resistant lining and a cooling jacket. The procedure followed is initially to take the inorganic salts and to introduce the moist bisdiazonium salt in portions. The heat of hydration thereby liberated is removed by external cooling with cold water.

After the degree of purity has been determined, it is standardized to a specific value, for example 20%, relative to a molecular weight of 328, by adding further sodium sulfate.

(b) Production of a coloration on a fiber material composed of natural cellulose:

A mixture of four parts of ethanol, four parts of water, 1.4 parts of 32% strength sodium hydroxide solution and 1.4 parts of 33% strength formaldehyde is poured over 2.8 parts of 2-hydroxynaphthalene-3-carboxylic acid 1-naphthylamide, and the latter is dissolved by stirring. After 10 minutes, this solution is poured into 1,000 parts of water containing 8.5 parts of 32% strength sodium hydroxide solution and two parts of a fatty acid/protein degradation product condensate. 50 parts of bleached, boiled out and wetted out cotton yarn are introduced into this liquor and are treated therein for 30 minutes with good agitation. The material to be dyed is then taken out, rinsed in a solution of 30 parts of sodium chloride and 1.3 parts of 32% strength sodium hydroxide solution in 1,000 parts of water and put into a development bath, which is prepared as follows: 6.75 parts of the dyeing preparation mentioned above and also 5 parts of chromium acetate G green and one part of an alkyl polyglycol ether are dissolved in 1,000 parts of water. Textile material is introduced into this development bath and treated for 30 minutes, and is then taken out and rinsed, soaped and dried in a customary manner.

A blue dyeing is obtained in a good color yield and with good fastness properties.

EXAMPLE 3

(a) A preparation for the production of water-insoluble azo dyestuffs on the fiber, which is free from metal salts which form water-insoluble hydroxides, is prepared by mixing the moist bisdiazonium salt obtained in accordance with Example 1 with an equal amount of sodium sulfate and then drying the mixture in a stream of warm air at 40° C.

After the degree of purity has been determined, the latter is standardized to a specific value, for example 20%, relative to a molecular weight of 328, by adding further sodium sulfate.

(b) Production of a coloration on cotton yarn:

8 parts of 2-hydroxynaphthalene-3-carboxylic acid 4-chloro-2-methylphenylamide are made into a paste with 13 parts of ethanol and are dissolved by adding 5.5 parts of 32% strength sodium hydroxide solution and 16 parts of water at 40° C. 4 parts of 33% strength formaldehyde solution are then also introduced. After 10 minutes this stock solution is poured into a solution of 44 parts of 32% strength sodium hydroxide solution, 120 parts of sodium chloride and 18 parts of a commercial protein degradation product/fatty acid condensate in 6,000 parts of softened water at 35° C. A cheese containing 600 parts of cotton yarn which has been boiled out under alkaline conditions with a surfactant and a sequestering agent in order to remove interfering non-cellulose substances is treated in this liquor for 30 minutes.

After the liquor has been drained off, the impregnated cheese is rinsed for 10 minutes with a solution of 240 parts of sodium chloride and 4 parts of 32% strength sodium hydroxide solution in 6,000 parts of water. When the rinsing liquor has been drained off, the development liquor at approx. 20° C. which has been prepared as follows is pumped through the cheese:

30 parts of the dyeing preparation prepared in accordance with paragraph (a) and 22 parts of sodium dihydrogen phosphate dihydrate, 48 parts of disodium hydrogen phosphate dodecahydrate and 12 parts of an octadecyl alcohol polyglycol ether are dissolved in 6,000 parts of water. After about 30 minutes, the development liquor is drained off and the cheese is given an acid rinse, clarified by cold rinsing, soaped, first at 60° C. and then at 100° C., then rinsed under warm and cold conditions and finally dried, in a customary manner.

A blue coloration is obtained in a good color yield and with good fastness properties.

EXAMPLE 4

(a) 300 parts of 4,4'-diamino-3,3'-dipropoxybiphenyl are introduced into 600 parts of water and are stirred thoroughly therein. 260 parts of 32% strength hydrochloric acid are then added dropwise, a mash of the hydrochloride being formed. After the mixture has been stirred for a further hour in order to complete the formation of the hydrochloride, a further 320 parts of 32% strength hydrochloric acid are added. The mixture is cooled to approx. 20° C. by external cooling. 370 parts of a 40% strength aqueous solution of sodium nitrite are then added dropwise at such a rate that nitrite is initially only slightly in excess, or not at all. The temperature is kept at 10-15° C. during the diazotization. When the diazotization is complete, a distinct excess of nitrite should be present.

10 parts of clarifying charcoal are then added. After about five minutes the outflow is tested by spotting. If it is pure yellow, the mixture is filtered with suction after adding 10 parts of kieselguhr; if it is still brown, further charcoal must be added. The residue is washed with a little water. The temperature of the mixture is lowered during the clarification, and, if necessary, this is continued during the precipitation which now follows until a temperature of approx. 15° C. has been reached. The bisdiazonium salt is precipitated by adding dropwise 450 parts of 33% strength zinc chloride solution to the slightly brownish diazonium salt solution. In the course of this 3,3'-dipropoxybiphenyl-4,4'-bisdiazonium tetrachlorozincate is precipitated in beautiful yellow crystals. The precipitation is completed by adding 250 parts of sodium chloride. The bisdiazonium salt is then filtered off with suction and freed from the bulk of the adhering mother liquor by centrifugation. The residual moisture content is still approx. 8%.

(b) The moist bisdiazonium salt obtained can be converted, by the procedure of Example 2(a) or 3(a), into a stable diazonium salt preparation which can be used in a manner analogous to that described in Example 2(b) or 3(b) for the production of water-insoluble azo dyestuffs on cellulose fibers.

EXAMPLE 5

373 parts of 4,4'-diamino-3,3'-diisopropoxybiphenyl bishydrochloride are introduced into a vessel containing 700 parts of water and 465 parts of 32% strength hydrochloric acid. A homogenizer (for example an Ultraturrax appliance) is used to achieve fine distribution. The mixture is cooled to 0° C. by external cooling. 370 parts of a 40% strength aqueous solution of sodium nitrite are then added dropwise at such a rate that the temperature does not rise above 6° C. and nitrite is initially in only a slight excess, or not at all. When the diazotization is complete, however, a definite excess of nitrite should be present.

10 parts of clarifying charcoal are then added and the outflow of a spotting test is checked after a few minutes to see whether it is pure yellow. If this is the case, the mixture is filtered with suction through a filter charged with 10 parts of kieselguhr, if not, more charcoal must be added. The filter residue is washed with a little water.

290 parts of sodium tetrafluoroborate are added to the filtrate and wash water continuously, most advantageously by means of a metering device, in the course of 15–30. minutes. 3,3'-diisopropoxybiphenylbisdiazonium tetrafluoroborate is precipitated in fine pale-yellow crystals. After a little further stirring these crystals are filtered off with suction and are freed from excess mother liquor by centrifugation.

The dyeing preparation is produced by mixing the bisdiazonium salt thus isolated with an equal amount of sodium sulfate and then drying the mixture in a stream of warm air at 40° C.

EXAMPLE 6

328 parts of 4,4'-diamino-3,3'-bis(1-methylpropoxy)-biphenyl are converted into a diazonium salt solution as described in Example 1.

The bisdiazonium salt is precipitated by adding 220 parts of a 65% strength solution of zinc chloride dropwise to the filtrate and the wash water. 3,3'-bis-(1-methylpropoxy)-biphenyl-4,4'-bisdiazonium tetrachlorozincate is precipitated in beautiful yellow crystals. After a little further stirring, these crystals are filtered off with suction at approx. 5° C. and are freed from the bulk of the adhering mother liquor by centrifugation.

The moist diazonium salt thus obtained is then converted into a dyeing preparation as indicated in Example 3(a).

We claim:

1. A bis-diazonium salt of the formula

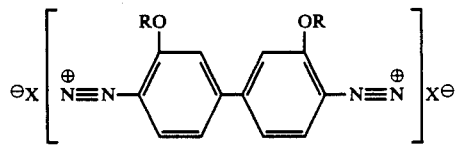

in which R denotes linear or branched alkyl or alkoxyalkyl having a total of 3–5 carbon atoms and $X^{\ominus}$ represents $HSO_3^-$, $BF_4^-$ or $^-$.

2. A bisdiazonium salt of the formula

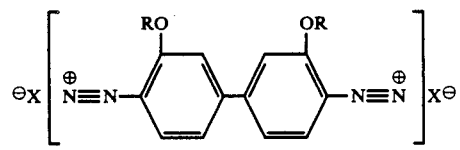

in which R denotes propyl, butyl, 2-methoxyethoxy or 2-ethoxyethoxy, and $X^{31}$ denotes $BF_4^-$ or $^-$.

3. A precipitated, solid bisdiazonium salt of the formula

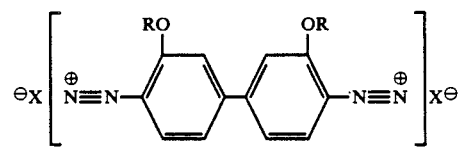

in which R denotes propyl or butyl, and $X^-$ denotes $BF_4^-$ or $^-$.

4. A precipitated, solid bisdiazonium salt according to claim 3, wherein $X^-$ denotes $^-$.

5. A precipitated, solid bisdiazonium salt according to claim 3, wherein R is 1-methyl-ethyl.

* * * * *

UNITED STATES PATENT AND TRADEMARK OFFICE
CERTIFICATE OF CORRECTION

PATENT NO. : 4,987,221
DATED : January 22, 1991
INVENTOR(S) : Hasso Hertel, Klaus Hunger and Heinrich Frolich It is certified that error appears in the above-identified patent and that said Letters Patent is hereby corrected as shown below:

COLUMN 6;

In claim 1, last line, after "or" insert --$[ZnCl_4/2]$--.

In claim 2, last line: "$X^{31}$" should read --$X^-$--; also, after "or" insert --$[ZnCl_4/2]$--.

In claim 3, last line, after "or" insert --$[ZnCl_4/2]$--.

In claim 4, last line, after "denotes" insert --$[ZnCl_4/2]$--.

Signed and Sealed this

Twelfth Day of January, 1993

Attest:

DOUGLAS B. COMER

*Attesting Officer*  *Acting Commissioner of Patents and Trademarks*